US007337860B2

(12) United States Patent
McIntyre

(10) Patent No.: US 7,337,860 B2
(45) Date of Patent: Mar. 4, 2008

(54) APPARATUS AND PROCESS FOR REMOVING LIQUIDS FROM DRILL CUTTINGS

(75) Inventor: Barry E. McIntyre, Calgary (CA)

(73) Assignee: Clean Cut Technologies Inc., Calgary (CA)

( * ) Notice: Subject to any disclaimer, the term of this patent is extended or adjusted under 35 U.S.C. 154(b) by 322 days.

(21) Appl. No.: 11/001,576

(22) Filed: Dec. 1, 2004

(65) Prior Publication Data

US 2005/0153844 A1 Jul. 14, 2005

Related U.S. Application Data

(60) Provisional application No. 60/526,260, filed on Dec. 1, 2003.

(51) Int. Cl.
*E21B 21/06* (2006.01)
*B01D 1/14* (2006.01)

(52) U.S. Cl. ...................... 175/66; 134/25.1; 134/25.5; 134/105; 175/206; 175/207; 210/770; 210/771; 588/900

(58) Field of Classification Search .................. 175/66, 175/206, 207; 134/25.1, 25.5, 105, 182; 210/770, 771; 405/129.2; 507/910; 588/249, 588/900
See application file for complete search history.

(56) References Cited

U.S. PATENT DOCUMENTS

| | | | | |
|---|---|---|---|---|
| 4,139,462 | A * | 2/1979 | Sample, Jr. | 210/774 |
| 4,222,988 | A * | 9/1980 | Barthel | 422/309 |
| 4,319,410 | A * | 3/1982 | Heilhecker et al. | 34/75 |
| 4,387,514 | A * | 6/1983 | McCaskill, Jr. | 34/368 |
| 4,411,074 | A * | 10/1983 | Daly | 34/479 |
| 4,683,963 | A * | 8/1987 | Skinner | 175/66 |
| 4,725,362 | A * | 2/1988 | Dugat | 210/710 |
| 5,361,998 | A * | 11/1994 | Sirevag et al. | 241/79.1 |
| 5,405,223 | A * | 4/1995 | Sirevag | 405/129.2 |
| 5,570,749 | A * | 11/1996 | Reed | 175/66 |
| 6,530,438 | B1 * | 3/2003 | McIntyre | 175/66 |
| 6,695,077 | B2 * | 2/2004 | Szymocha et al. | 175/66 |
| 6,978,851 | B2 * | 12/2005 | Perez-Cordova | 175/206 |
| 2003/0136747 | A1 * | 7/2003 | Wood et al. | 210/774 |

* cited by examiner

*Primary Examiner*—George Suchfield
(74) *Attorney, Agent, or Firm*—Marsh Fischmann & Breyfogle LLP

(57) ABSTRACT

Drill cuttings associated with drilling fluid are thermally cleaned. The wet cuttings are fed into a vessel chamber having mechanical mixers, such as ribbon blenders, extending lengthwise of the chamber. Direct heating is applied to the chamber contents by introducing hot combustion gas from a heater. A combination of direct heating and mechanical back mixing of wet colder cuttings with drier hotter cuttings results in conditioning and conduction heating of the wet cuttings. The drilling fluid is evaporated and removed as gas. Dried cuttings are separately recovered. Caking and agglomeration of the solids is reduced.

12 Claims, 3 Drawing Sheets

APPARATUS AND PROCESS FOR REMOVING LIQUIDS FROM DRILL CUTTINGS

CROSS-REFERENCE TO RELATED APPLICATIONS

This application claims priority of U.S. Provisional Patent Application No. 60/526,260, entitled "AN APPARATUS AND PROCESS FOR REMOVING LIQUIDS FROM DRILL CUTTINGS", filed Dec. 1, 2003, which is incorporated herein by reference in its entirety.

FIELD OF THE INVENTION

The field of the invention is the thermal removal of associated liquids, such as drilling fluid and water, from drill cuttings generated in the drilling of oil and natural gas wells, with the aim of separately recovering substantially dry cuttings and gases derived from evaporation of the liquids.

BACKGROUND OF THE INVENTION

Drilling for oil and gas produces drill cuttings which are brought to ground surface in the circulating drilling fluid. The drill cuttings are substantially separated from the drilling fluid using various combinations of shale shakers, centrifuges and mud tanks. However, some liquid or moisture remains associated with the solid "cuttings" as a surface layer and, in some cases, internally thereof. The terms "wet cuttings" or "contaminated cuttings" are used interchangeably herein to denote this mixture. In cases where the drilling fluid is hydrocarbon based, the cuttings usually are associated with oil, water and drilling fluid chemical additives.

Disposal of the wet cuttings is often problematic, as the associated liquids are of environmental concern.

This moisture associated with the cuttings also presents problems in handling and treatment. There is a well-known propensity of these cuttings to cake or form unwanted agglomerations when heated and due to mechanical handling and transport operations. This tendency is affected by the amount of liquid present and the nature of the solids and liquids. The tendency may be quite variable.

Current methods for treating wet cuttings generally are not integrated into the drilling operation, but are administered 'after the fact'. The focus is on how to clean up the mess once drilling is terminated, rather than on how to prevent its occurrence in the first place. With most currently used methods, little, if any, of the liquids are recovered.

On land, the current methods used for wet cuttings disposal are: haul to land-fill; composting; bio-remediation; thermal desorption; and combustion. Off-shore applications usually require shipping the cuttings to shore for processing or deep well injection, as new regulations limit the ability for overboard disposal.

Land fill disposal has long term environmental liability; composting and bio-remediation methods are time consuming and often require mixing with uncontaminated soil prior to final covering; and the known thermal methods do not address concerns with salt and other contaminants.

An additional issue is the loss of drilling fluid. The lost fluid results in increased costs to the drilling operator, as do the increased disposal costs.

Thermal processes are appealing for use in cleaning up cuttings associated with hydrocarbon-base drilling fluid, because they can theoretically achieve a zero residual hydrocarbon level. The thermal desorption processes currently used focus on removal of the liquids after drilling is terminated. The processing units are large and usually involve two stage processes that first remove and then either burn or recover the liquids.

More particularly, the known thermal processes typically involve use of heated screws, rotating kilns or fluidized bed combustion reactors. The equipment used tends to be large scale, fixed capacity units that require a substantially constant feed rate and uniform feed composition. They are not well adapted for handling changes in cuttings generation rates or varying composition while drilling. They are also scale limited due to large capital costs.

The previously described caking and agglomeration tendencies of the cuttings are a significant problem in applying these known thermal processes. When agglomerates or cakes form, the outside initially may be heated and dry out, forming a hard, insulating layer. The inside of the cake remains wet and is difficult to dry due to this insulating effect. It is thus desirable to reduce formation of these cakes or agglomerates in the context of wet cuttings treatment using a thermal process.

Prior art thermal techniques for cleaning drill cuttings are exemplified by the following:

Sample (U.S. Pat. Nos. 4,139,462 and 4,208,285) uses indirect heating of a screw mechanism and jacketed chamber to heat cuttings as they are progressively conveyed through the chamber, venting the gases off. The heating is indirect, via cuttings contact with the screw and vessel walls that are in turn heated by a means such as thermal fluid circulating in jackets that separate the heating medium from the material being heated. Another application using similar conveyance and heating methods is taught by DesOrmeax (U.S. Pat. No. 4,606,283).

McCaskill (U.S. Pat. No. 4,387,514) teaches a process using convection heating with a dry, oxygen rich fixed gas to evaporate liquids from cuttings that are conveyed in a linear, progressive manner from one end of a processor to the other. Vibration is added to prevent agglomeration of the solids on drying. The operating environment is too lean to support auto-ignition of the vapors.

Reed (U.S. Pat. No. 5,570,749) suggests a system that first reduces the amount of liquid on the solids using items such as settling tanks. After reducing the liquid content, the cuttings are routed through an indirectly heated rotating drum unit for final drying.

Daly (U.S. Pat. No. 4,411,074) proposed a rotating kiln process wherein the contaminated cuttings are progressively heated in the rotating drum as they progress through it with the vapors generated being burned.

There are other methods commercially employed for thermal treatment of drill cuttings. One known system is a low temperature process that utilizes heated screws in a heated chamber to evaporate liquids from soils as they are progressively conveyed from one end of the processor to the other. This process uses indirect heat supplied by a hot oil system. The temperatures are 400-500 F. A slight vacuum is maintained to draw gases out of the system.

The Indirect Thermal Desorption Series 6000 System of Newpark Environmental Services is a rotating drum design. This heat-jacketed system has been used to clean drill cuttings.

SUMMARY OF THE INVENTION

The present invention combines direct heating and mechanical mixing of wet and partly dry drill cuttings in a processor, whereby a combination of material 'conditioning', conduction heating and direct heating reduce caking and evaporate drilling fluid and other liquids associated with the cuttings.

By 'conditioning' is meant that drier, hotter cuttings present in the processor chamber are back-mixed with newly added wet cuttings. As a consequence, the wetness of the resulting mixture can be reduced to a level that is less likely to cake and/or agglomerate.

By mixing the drier, hotter material with the wetter, colder material, heat transfer by conduction takes place. This supplements the heat supplied directly, such as by forced flow of hot gases through the mixture.

The process therefore utilizes less effective conductive heat transfer, but combines it with creating a greater solids surface area as a result of mechanical mixing of the wetter and drier cuttings, and further combines it with direct heating.

By combining conditioning with direct and conductive heating, the process lends itself to using a compact processor.

In one preferred apparatus embodiment of the invention, there is provided:

- a processor, which may be a single fixed closed vessel forming an elongate internal chamber;
- a source of wet drill cuttings, which may be the drilling fluid returns treatment system (such as the shale shakers, centrifuges and the like) of a drilling operation, or another source such as a stockpile or sump;
- a means for feeding wet cuttings from the source into the vessel chamber;
- a means, such as a burner, for generating hot gas and forcing it through the chamber contents;
- a means, such as ribbon mixers, positioned within and, more preferably, extending longitudinally of the chamber, for mechanically back-mixing wet and partly dried cuttings within the chamber and simultaneously advancing the mixture of cuttings along the chamber while further mixing them as they are directly heated by contact with the hot gas;
- a means for removing gases from the chamber; and
- a means, such as a weir-controlled or valve-controlled outlet, for removing dried cuttings from the chamber;
- so that wet drill cuttings introduced into the chamber may be mixed with already partly dried, relatively hot drill cuttings present in the chamber to cause conductive heat transfer between drill cuttings and the resulting drill cuttings mixture may simultaneously be further mechanically mixed and directly heated by the hot gas, whereby drilling fluid may be evaporated and dried drill cuttings are produced.

In a more preferred feature, the mixing means extend substantially throughout the chamber, so that the cuttings undergo mixing substantially continuously in the course of their residence time within the chamber.

In another more preferred feature, the hot gas is introduced through means such as outlets or nozzles distributed at or near the bottom of the chamber.

In a preferred method embodiment of the invention, there is provided a method for removing drilling fluid from wet cuttings, comprising:

- providing a processor, such as a fixed, closed vessel forming an elongate internal chamber having inlet and outlet ends, said chamber containing already partly dried, relatively hot drill cuttings;
- adding wet drill cuttings into the chamber;
- introducing a flow of hot gas into the chamber;
- mechanically back-mixing added wet drill cuttings with relatively hot drill cuttings and mixing, advancing and simultaneously directly heating the mixture of drill cuttings with the hot gas as it moves along the chamber, so that sufficient drilling fluid is evaporated from the drill cuttings, as they are heated, to produce vapors and drill cuttings that have been dried to a pre-determined drilling fluid content;
- separately removing produced vapors and gases from the vessel chamber; and
- separately removing the dried drill cuttings from the vessel chamber.

DESCRIPTION OF THE PREFERRED EMBODIMENT

Figure 7:
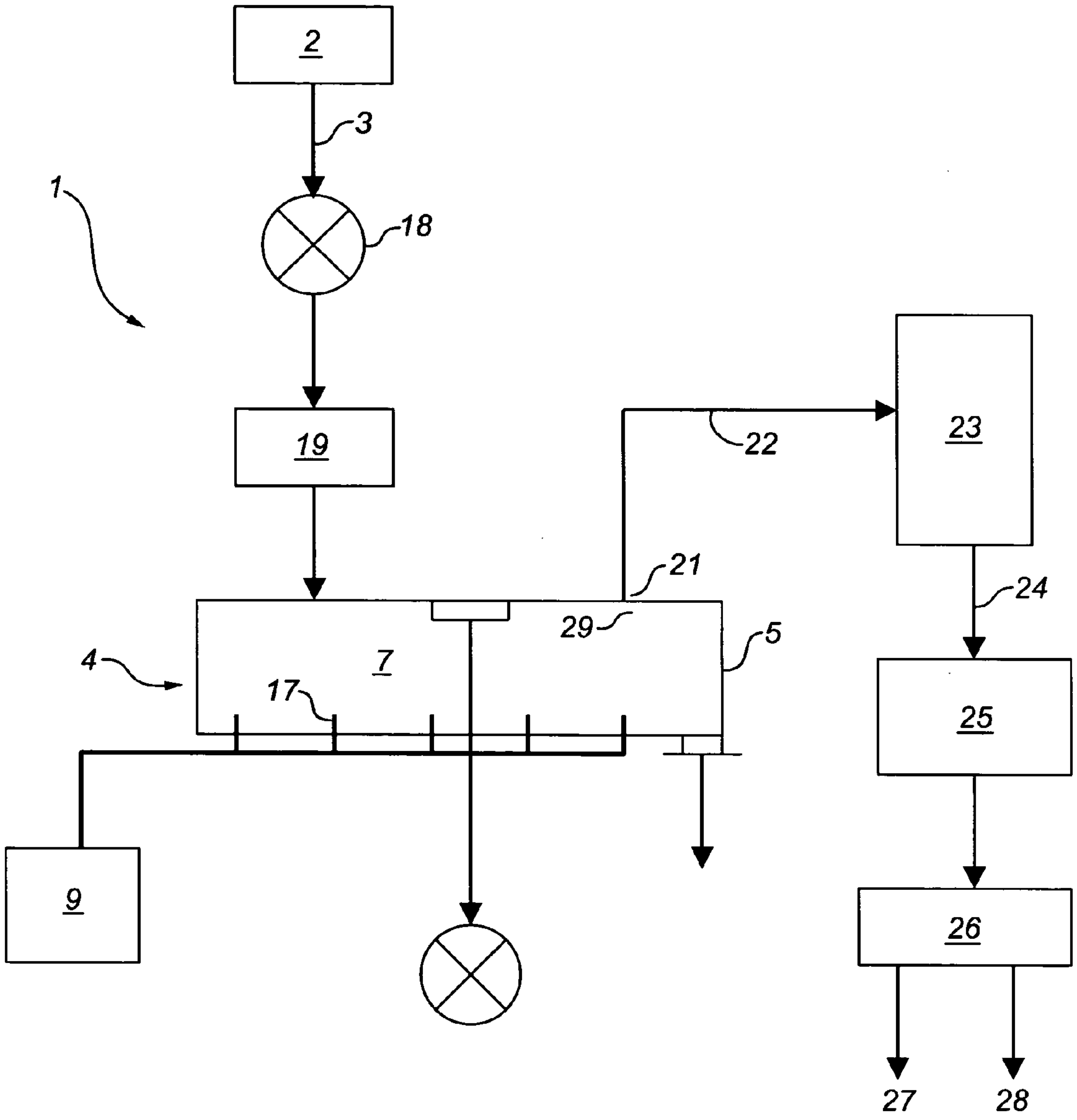
FIG. 7 is a schematic process flow diagram of the drill cuttings cleaning system, incorporating the processor.

Having reference to FIG. 7, the illustrated drill cuttings cleaning system 1 may be used in-line with a source 2 of wet cuttings 3, such as an on-going drilling rig operation, from which it directly receives wet drill cuttings 3 from the rig's cuttings/fluid separation assembly. Alternatively the cleaning system 1 may be supplied with cuttings 3 from another source, such as a sump left after drilling has ended. The cuttings 3 may be supplied at a constant or variable rate on a continuous or batch basis.

In the case of an on-going drilling operation, the drilling fluids are circulated through the borehole to carry drill cuttings from the bottom of the borehole to ground surface while drilling is taking place. It is necessary to remove most of the solid drill cuttings from the drilling fluid to maintain proper fluid properties for hole cleaning and other related concerns such as well bore stability, rate of penetration and formation damage.

The solid drill cuttings are normally mechanically separated from the drilling fluid by a combination of steps. First, the solids-laden drilling fluid issuing from the borehole is flowed over a shale shaker that uses screens to remove most of the coarse solids. The shaker fluid underflow is then passed through a centrifuge to separate out solid fines. The product streams of the shaker overflow and the centrifuge underflow each provide wet cuttings 3 that need to be processed by cleaning systems such as that of this invention. The shaker overflow and centrifuge underflow streams may be processed either singly or in combination. They have a highly variable fluid content, ranging between 5-45 wt. %, typically around 20 wt. %. These product streams provide the "wet cuttings" that are to be processed.

The wet cuttings 3 may be fed directly into the cleaning system 1. Alternatively, they may be pre-treated, when suitable, by techniques such as solvent washing or in equipment, such as The Brandt/Wadeco High G™ dryer or a screw press, to reduce liquid content.

Figure 2:
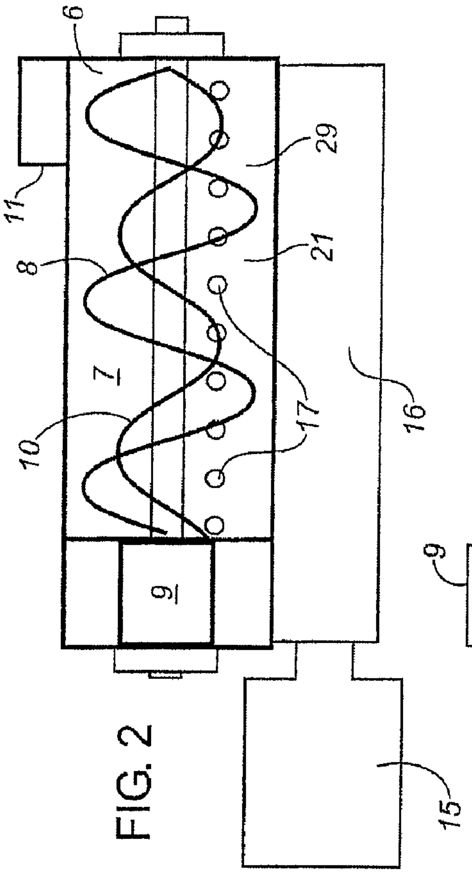
FIG. 2 is a schematic sectional top view of the processor.
Figure 3:
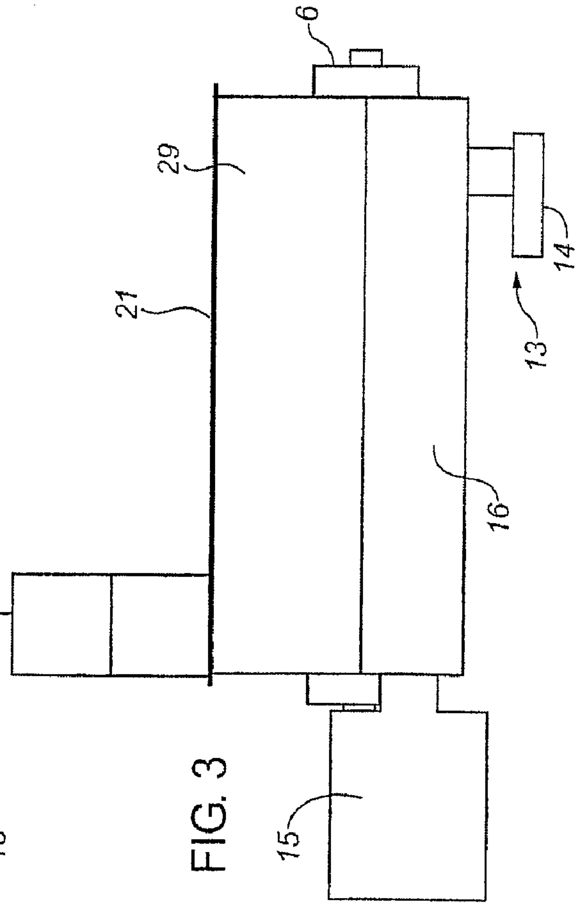
FIG. 3 is a side view of the processor.
Figure 1:
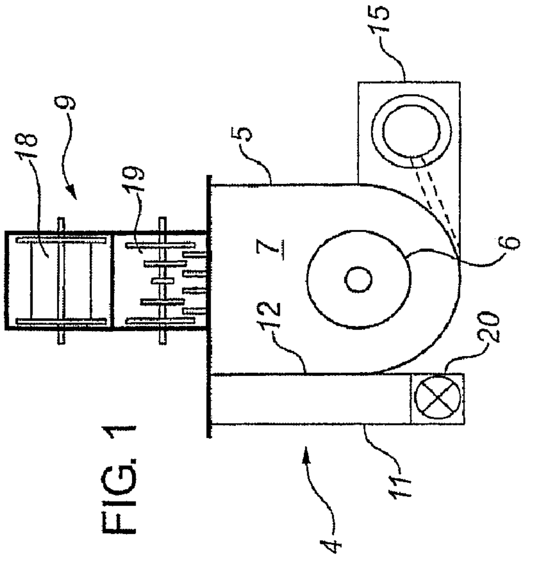
FIG. 1 is a schematic sectional end view showing the processor.
Figure 5:
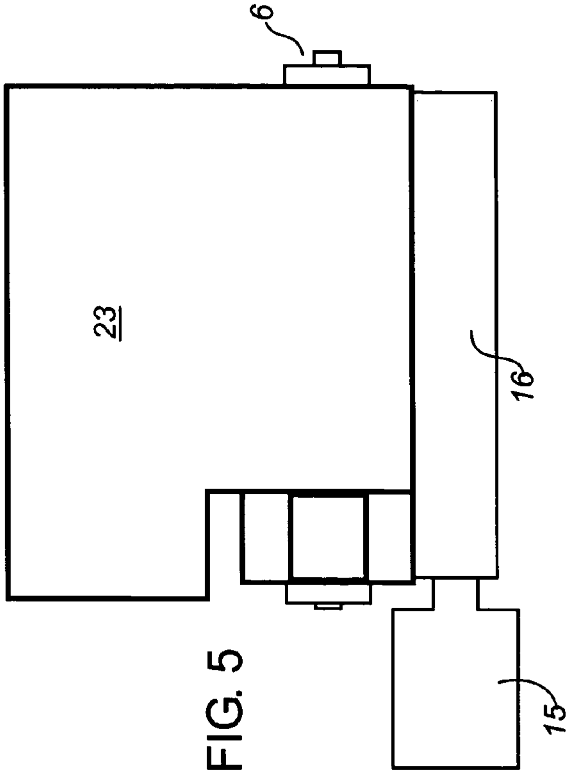
FIGS. 4-6 correspond with FIGS. 1-3 but further show the baghouse attached to the processor.
Figure 6:
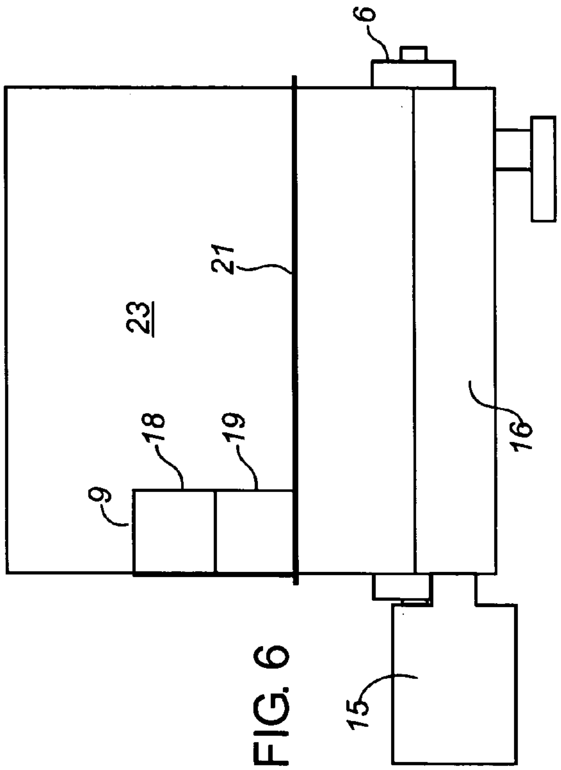
Figure 4:
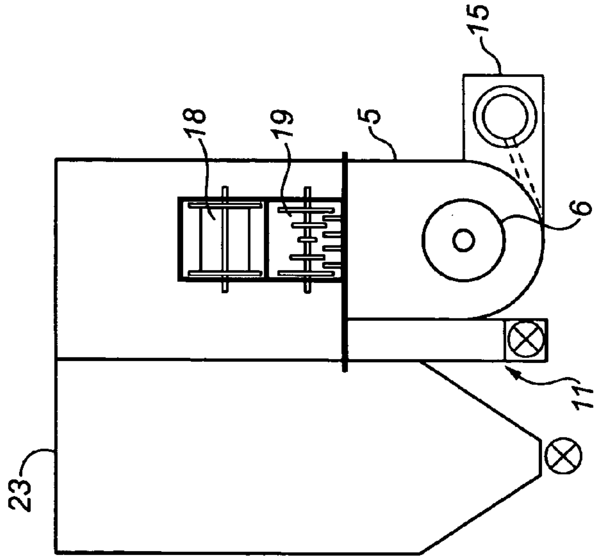

Having regard to FIGS. 1, 2 and 3, the processor 4 is now described in connection with its application to wet cuttings 3 contaminated with hydrocarbon-based drilling fluid.

The processor 4 is a directly heated, mechanical mixing device. The drive motors and other peripheral equipment necessary for a complete operating system are not shown in the Figures because they have no unique features relative to the invention.

All components of the processor 4 are selected to operate reliably at temperatures sufficient to vaporize the hydrocarbon liquids contaminating the wet cuttings 3, plus an additional safety margin to give a maximum failure temperature above operating temperature. The normal expected operating temperature is about 650 ®F., a temperature which is sufficient to vaporize substantially all of the hydrocarbons from the wet cuttings 3 given the properties of currently used hydrocarbon-based drilling fluids. Design temperature capability should be determined from the vaporization characteristics of the fluids to be vaporized. If these characteristics are not published or known, lab experiments can be conducted to find the appropriate temperature. The maximum temperature to provide a processing safety margin is dependent on material selection and detail design.

In the preferred embodiment shown, the thermal processor 4 comprises a trough-shaped, fixed (i.e. non-rotating) mixing vessel 5 containing one or more rotating mechanical rotors 6. The rotor type may be, but is not limited to, a ribbon blender, a paddle assembly or a discontinuous flight auger assembly. The rotor 6 shown is a ribbon blender extending longitudinally of the vessel chamber 7. The outside ribbon 8 mixes cuttings and advances them toward the feed inlet 9 while the inside ribbon 10 mixes cuttings and advances them toward the product outlet 11 and overflow weir 12. The ribbons 8, 10 function cooperatively to back mix partly dried, hotter cuttings with incoming colder wet cuttings. Otherwise stated, the general flow of the outside cuttings toward the feed inlet 9 assists in pushing the incoming wet cuttings 3 toward the longitudinal axis of the vessel chamber 7.

The vessel 5 and rotors 6 are suitably sealed to prevent gas leakage in or out. The vessel 5 may be operated under positive pressure, vacuum or neutral pressure.

As previously stated, the vessel 5 has a feed inlet 9. It also has a solids product outlet 11 comprising an overflow weir 12, for controlling solids level. It further has a bottom outlet 13 and gate valve 14 for cleaning and periodic removal of larger solids. The larger solids, such as lumps, tend to be retained by the weir 12. The vessel 5 also has a top outlet 21 for gas and vapor removal.

A variable capacity combustion heater 15 provides hot combustion gases through a plenum 16 supplying nozzles 17 located along the length of the vessel chamber 7 adjacent its base. The hot gases provide direct heat to the chamber contents and, in conjunction with the mixing action, facilitate the two-pronged heat transfer method. The chamber 7 contents therefore receive direct heating, while the mixing causes conduction heating as well, since the drier material absorbs heat and in turn transfers it to the less dry material.

The heater 15 is operated at close to stoichiometric conditions to prevent entrance of oxygen into the chamber 7. The heater 15 should be equipped with conventional fail-safe means to prevent introduction of air when the heater fails or runs out of fuel.

The feed inlet 9 is equipped with an air-lock 18 and a lump breaker 19 in sequence, to provide a seal preventing air penetration and to ensure a consistent material feed flow.

As previously mentioned, partly dried, hotter cuttings are mixed by the rotor 6 toward the incoming wet cuttings 3 to promote favourable conditioning and reduce caking and agglomeration.

As cuttings 3 are dried, their volume in the vessel chamber 7 increases and they overflow the weir 12 and exit the vessel chamber 7 through a rotary airlock 20. The drier cuttings, being lighter than the wetter cuttings 3, tend to rise to overflow the weir 12.

The top outlet 21 is optionally connected by a duct 22 with a baghouse 23, for removing contained fines (see FIGS. 4 to 7). The top outlet 21 and duct 22 are designed to be large, to slow gas velocity and reduce fines carry over. The direct connection of the vessel 5 top outlet 21 with the baghouse 23 is designed to promote efficient gas transfer and to reduce or eliminate the need for baghouse 23 heating to prevent condensation. The close proximity to the vessel 5 enables use of vessel heat in the baghouse 23.

Having regard to FIG. 7, the baghouse 23 is, in turn, optionally connected by a duct 24 with a condenser 25 and separator 26 for condensing and producing valuable fluids 27 and removing non-condensable gases 28.

The baghouse 23 will be conventionally equipped with air-locks to maintain a seal for solids removal.

The weir 12 provides the main control over the vessel-volume of solids within the vessel 5. The heater 15 is controlled to provide adequate heat both in the vessel chamber 7 and in the vapor space 29 to prevent condensation in the baghouse 23. The seals, valves and air-locks maintain a low oxygen environment to prevent explosion and other unwanted chemical reactions.

The process of the preferred embodiment is now described. Preferably, prior to treatment of wet cuttings 3, the vessel chamber 7 is filled with a dry charge of material comparable to dry, treated cuttings. Hot sand would be a suitable material for the first charge. Subsequent applications could use residual cuttings after conclusion of treatment. This dry charge forms the base material for both conditioning incoming wet cuttings 3 to promote faster, more even drying, and providing heat transfer for drying of the wet cuttings 3. The mechanical rotor(s) 6 may be started prior, during or after feeding the dry charge into the vessel chamber 7, but preferably prior to the introduction of wet cuttings 3. Preferably, the rotor 6 speed is variable, and the attachments to the shaft have an adjustable configuration. Normally, the rotor 6 speed will result in a maximum outside tip velocity of less than about 300 feet per minute. The heater 15 is started up, introducing heat through the nozzles 17 into the chamber 7 to bring the temperature to approximately 650° F. (approximately 340° C.), as measured in the head space 29. The actual temperature requirement is determined by the vaporization characteristics of the fluids being removed.

At this time, wet cuttings 3 are fed through the feed air-lock 18 and lump breaker 19 into the vessel chamber 7. As the material enters the vessel chamber 7, it is mixed with drier cuttings to reduce average moisture content to reduce the risk of caking. In addition, it is heated by contact with the hot, drier cuttings and with the hot gases from the combustion heater 15 that heat all the material in the vessel chamber 7. In this way the wet cuttings 3 are simultaneously conditioned and heated. As the wet cuttings 3 are dried, their volume in the vessel chamber 7 increases and they overflow the outlet weir 12, exiting the vessel chamber 7.

The following example illustrates the robust methods used to determine parameters such as the desirable vessel chamber volume for conditioning the wet cuttings. An important element in selection of design parameters is the understanding of material characteristics and operator requirements. In an ongoing drilling operation, stoppages are to be avoided, so very robust assumptions are desirable.

An 8 metric tonne per hour unit is to be used. Wet cuttings from the centrifuge underflow and shaker overflow can vary a lot but can average 20% by weight moisture, with extremes as high as 40% having been measured due to improper equipment performance. This "worst case" should be allowed for. To prevent caking, measurements show that caking tendencies drop off as the moisture content drops below approximately 12%. At 20% by weight moisture, a 1:1 ratio may suffice. At 40% moisture, 3:1 may be required. With a safety margin, ratio of 4:1 by weight may be selected. This means that 4 metric tonnes per hour of wet cuttings require an additional volume of 32 metric tonnes of dry cuttings per hour ("dry" in this case meaning a moisture level at or near the desired post treatment target level, normally less than 3% liquid by weight). With an expected residence time of 10 minutes, or ⅙ of an hour, the volume would be (32+8)/6=6.67 tonnes. Laboratory scale model tests have shown that expected residence time of 3-5 minutes is adequate for drying, so the 10 minute residence time is conservative.

The wet cuttings have a density of approximately 1,700 kg/m3, and the dry cuttings have a density of about 2,600 kg/m3, so the weighted average provides a total volume of 2.84 cubic meters, which is rounded up to 3.0 cubic meters, approximately 110 cubic feet, for the vessel chamber. This also represents a desirable initial charge volume of dry material to be used. The volume required for a 10 minute residence time is much smaller than this, being approximately ⅙ the size. This will result in an actual residence time of approximately 1 hour for the average particle leaving the bulk moisture content sufficiently low to an approximately "dry" state and providing sufficient dry material for conditioning and heat transfer. The residence time will see the particles both dried and used for drying and conditioning purposes. The significant length of time provides additional protection against possible short-cutting of wet material towards the outlet.

Proposed general design specifications for the mixing vessel are as follows:

One (1) Heavy Duty Continuous-type Ribbon Mixer, as per the following specifications.

Service: Continuous Duty Blending of hot, fine, dense and moderately/highly abrasive powdery material with densities to 163 lbs/cu.ft., having relatively free flowing characteristics and non-hygroscopic in nature/behaviour. Drive design based upon 24 hrs/day operation.

Ribbon Mixer:

Capacity: Total Trough Body Volume=4.39 cu.m. (155 cu.ft.)

Proposed Operating Level=3 cu.m. (106 cu.ft.)

Trough Size: 51" inside width×55" inside depth×120" inside length including weir discharge.

Trough: Roll formed trough section with end plates welded to the trough to give rigid construction. To each end plate are externally mounted the reinforcing ribs, gussets and outboard bearing support brackets. To the trough section are fitted the four leg supports/mounting brackets for desired clearance of operation of unit. The top edge of the trough is formed to provide for cover attachment. Trough designed for 2 psig maximum operating pressure. The trough is designed to accept a nozzle manifold near the bottom for direct heat injection.

Trough Openings: Full trough width weir-type flanged discharge and also a flanged discharge outlet with standard ASA 150# drilling pattern to accommodate 10" dia. valve.

Trough Insulation: Cell-U-Foam High Temperature Insulation

Trough Sheathing: Seal welded Stainless Steel Sheet Metal, thickness and exact composition to be determined by desired wear characteristics.

Ribbon Blender: Three piece heavy duty, construction consisting of drive end stub shaft, centre ribbon stirrer section and tail end stub shaft. All sections are provided with flanges, which are machined for perfect alignment and, when bolted together, give a concentric assembly with constant clearance. The ribbon comprises a solid shaft, pipe or mechanical tube through which the support arms are fitted and welded. The right and left hand pitched internal and external spiral ribbon flights are fitted and welded to these arms. These are arranged in such a way that the inside flights generally move the product towards the discharge end of the trough and the outside ribbons generally move the product towards the inlet. This motion, together with movement tangential to the ribbon flight, gives the multi-motion mixing and blending that ensures a reasonably homogeneous product.

Shaft Seals: Water-Cooled Stuffing box type packing glands externally mounted for ease of service and adjustment. Glands supplied with connection for use for air purging/lubrication/flushing of packings, packing rings of the braided rope type with spacers and lantern rings compatible with process conditions.

Shaft Bearings: Heavy duty, sealed for life, 5¹⁵⁄₁₆" diameter, adapter sleeve mounted, spherical roller, self-aligning pillow block bearings with cast/ductile iron bodies and standard double lip seal, externally outboard mounted and designed for continuous operation.

Cover: Reinforced gasketed construction to include feed openings and ductwork to connect to solids removal and/or condensation equipment.

Note: Ribbon Mixers ideally should be running while loading of units and, unless specified, are designed as far as power requirements, to operate in this manner. They will, in the event of power outages, start under full load, but this should not be general manner of operation. With this in mind, if units are to be manually loaded, we recommend the provision of bag support grids and possibly safety interlocks which provide operator safeguards during loading. Bag support grids and dust take-off vents are available as optional extras, which will be quoted upon request.

Discharge: Discharge of Mixer is through a full trough width weir-type flanged connection and also through a flanged nozzle at bottom center of the trough. A valve of 10" diameter is recommended for this unit. Discharge Valve: 10" diameter Knife Gate Valve Lug/Wafer Style Mounting for installation to ANSI Class 125/150 lb flange and with materials of construction:

Valve Trim: Body—Stainless Steel

Knife Gate—Stainless Steel

Seat—Metal

Operator: Servo

Clearance: Supports designed for totally open both sides access and with a clearance height of approximate 24" under discharge valve mounting flange face.

Drive: Direct Motor—Gear Reducer type drive consisting of:

Motor: 60 H.P., High Efficiency, 3/60/575 volts, 1750 RPM, Washdown Protection, TEFC enclosure.

Motor—Reducer Coupling: Steelflex or equal High Speed Coupling, 90 HP Mechanical Rating.

Reducer: Right Angle Arrangement, Helical Bevel Gear Reducer with approx. 80:1 reduction ratio, foot mounted type with 1.4 minimum Service Factor; 85 HP Mechanical Rating, which drives Mixer shaft at approximately 22 rpm.

Reducer—Ribbon Mixer Stirrer Coupling: Rigid type, double engagement gear type with 1.4 Service Factor, 85 HP Mechanical Rating.

Materials of Construction: Trough, Cover and Stirrer—all parts in contact with product in type 304 stainless steel. Balance—supports, guards etc. in carbon steel.

Optional: Additional Paddle-type mixing element using material with higher duty wear characteristics for high temperature, abrasive, corrosive conditions.

For heating requirements, based on a ratio of 90% oil, 10% water in the fluid, and a specific heat of 0.25 btu/lboF for the solids, net heating requirements can be approximately 500,000 btu per metric tonne, for a total of 4 million btu per hour. Estimating an 80% efficiency, the gross moves to 5 million per hour. To maintain a safety margin in case of severe short term heating demand, select 6 million btu per hour. The expected pressure requirement for the combustion heating unit may be: 20" water for the plenum and nozzles, 50" water to penetrate the material in the vessel, 10" for the baghouse, and 20" for the condenser for a total of 100". A safety margin may be maintained by using a minimum of 120" and a positive displacement blower, such as a Roots Blower. This process may provide more than adequate pressure while controlling airflow into the combustion unit. The heating unit can be capable of modulating its output to maintain pre-set operating temperature ranges, especially for the exiting gases.

The plenum may require approximately 220-½" nozzles near the bottom of the vessel and distributed along the length. In one embodiment the vessel may be 120" long. Consequently 2 rows of nozzles may further be required to allow for space between the nozzles. The manifold will require lining appropriate for sustained use at temperatures generated by diesel combustion. The same lining may also be required for the nozzles.

The combustion gas mass flow rate may be determined using stoichiometric air-fuel ratios by calculating the mass flow rate for gas from the wet cuttings, and by converting to volume based on a low estimate of density of 0.033 lb/ft3. The baghouse flow rates may be approximately 4200 cfm (approximately double the flow rate from the burner), also the expected flow rate through the condenser. The condenser requires handling a mixture of approximately 50% non-condensable gas. The solids removal equipment may remove solids from the mixing vessel at a rate of approximately 10% of the dry solids being fed into the vessel. This 10% estimation is based upon using Stoke's Law, with an expected gas flow velocity of 1.4 feet per second, and a viscosity of 2.83×10-4 Pascal-seconds. The viscosity level may be chosen at a high level for a safety factor as it may result in more carryover of solids. All particles of approximately 10 microns or less, which may comprise slightly less than 10% of the total solids may be expected to be entrained, and thus should be removed prior to condensation. This amount calculates to: 8 metric tonnes per hour raw feed ×0.8 dry fraction ×0.1=0.64 metric tonnes per hour (i.e., 640 kg or approximately 1400 pounds per hour). This may establish the baghouse design requirements, in conjunction with the temperature and pressure requirements.

As an option, cyclone separators may be used to reduce the solids loading prior to the baghouse by approximately 75% where high efficiency cyclones are used.

Depending on the particle size distribution of the drill cuttings, alternative methods may be used. These may include but are not limited to just using cyclone separators, using a scrubber, or no fine solids removal method at all. The fine solids control method selected and its design should be based on the characteristics of the expected material to be processed.

The embodiments of the invention in which an exclusive property or privilege is claimed are defined as follows:

1. A method for removing drilling fluid from wet drill cuttings, comprising:
- providing a processor having a fixed chamber containing already partly dried, heated drill cuttings;
- adding wet drill cuttings into the chamber, said wet drill cuttings being colder than the heated drill cuttings;
- introducing a flow of hot gas into the chamber;
- mechanically back-mixing added wet drill cuttings with heated drill cuttings to promote conductive heat transfer therebetween and simultaneously advancing and directly heating the mixture of drill cuttings with the hot gas, so that sufficient drilling fluid is evaporated from the drill cuttings, as they are heated, to produce drill cuttings that have been dried to a pre-determined drilling fluid content;
- separately removing produced vapors and gas from the vessel chamber; and
- separately removing the dried drill cuttings from the vessel chamber.

2. The method as set forth in claim 1 wherein:
- the processor comprises a fixed vessel forming the chamber and having internal means for mixing the drill cuttings.

3. The method as set forth in claim 2 comprising:
- directly feeding the wet drill cuttings from a drilling operation into the chamber.

4. The method as set forth in claim 3 wherein the drilling fluid is hydrocarbon-based drilling fluid.

5. The method as set forth in claim 2 wherein the drilling fluid is hydrocarbon-based drilling fluid.

6. The method as set forth in claim 1 comprising:
- directly feeding the wet drill cuttings from a drilling operation into the chamber.

7. The method as set forth in claim 6 wherein the drilling fluid is hydrocarbon-based drilling fluid.

8. The method as set forth in claim 1 wherein the drilling fluid is hydrocarbon-based drilling fluid.

9. Apparatus for removing drilling fluid from wet drill cuttings, comprising:
- a fixed vessel forming a fixed chamber;
- a source of wet drill cuttings;
- first means for feeding wet drill cuttings from the source into the chamber;
- second means for generating hot gas and forcing it through the chamber;
- third means for mechanically back-mixing and advancing drill cuttings within the chamber;
- so that wet drill cuttings introduced into the chamber may be mixed with already partly dried, relatively hot drill cuttings present in the chamber to cause conductive heat transfer between drill cuttings and the produced drill cuttings mixture may simultaneously be directly heated by the hot gas, whereby drilling fluid may be evaporated to produce gases and dried drill cuttings are produced;
- fourth means for removing produced gas and heating gas from the chamber as a separate stream; and
- fifth means for removing dried drill cuttings from the chamber as a separate stream.

10. The apparatus as set forth in claim 9 wherein:
- the second means has outlets positioned along the chamber which are operative to distribute hot gas lengthwise of the chamber to directly heat cuttings, as they move through the chamber, by forced flow heating.

11. The apparatus as set forth in claim 10 wherein:

the third means extend lengthwise of the chamber and are operative to mechanically mix drill cuttings along the length of the chamber.

12. The apparatus as set forth in claim 9 wherein:

the third means extend lengthwise of the chamber and are operative to mechanically mix drill cuttings along the length of the chamber.

* * * * *